US012499723B1

(12) United States Patent
Ke

(10) Patent No.: US 12,499,723 B1
(45) Date of Patent: Dec. 16, 2025

(54) INTELLIGENT LOCK THAT REPLACES ELECTRONIC COMPONENTS WITH A KEY

(71) Applicant: Guangzhou Runfu Biotechnology Co., Ltd, Guangzhou (CN)

(72) Inventor: Long Ke, Jiangxi (CN)

(73) Assignee: Guangzhou Runfu Biotechnology Co., Ltd, Guangzhou (CN)

( * ) Notice: Subject to any disclaimer, the term of this patent is extended or adjusted under 35 U.S.C. 154(b) by 0 days.

(21) Appl. No.: 19/212,665

(22) Filed: May 19, 2025

(30) Foreign Application Priority Data

Nov. 29, 2024 (CN) ........................ 202411741081.0

(51) Int. Cl.
*G07C 9/00* (2020.01)

(52) U.S. Cl.
CPC .................... *G07C 9/00174* (2013.01); *G07C 2009/00992* (2013.01)

(58) Field of Classification Search
None
See application file for complete search history.

(56) References Cited

U.S. PATENT DOCUMENTS

2021/0351920 A1* 11/2021 Tang .................. G07C 9/00309

FOREIGN PATENT DOCUMENTS

| | | | | | |
|---|---|---|---|---|---|
| CN | 113870460 | A | * | 12/2021 | ......... G07C 9/00944 |
| CN | 114215429 | A | * | 3/2022 | ............. G08B 13/00 |
| CN | 116084781 | A | * | 5/2023 | ........... E05B 3/0004 |
| GB | 260951 | A | * | 1/1927 | ............. H01B 7/083 |
| WO | WO-2022190094 | A1 | * | 9/2022 | ......... G07C 9/00896 |

* cited by examiner

*Primary Examiner* — K. Wong

(57) ABSTRACT

The present application discloses an intelligent lock enabling the replacement of electronic components using a key, comprising: a housing; an electronic component, which is detachably mounted on the housing; a locking assembly, disposed inside the housing and configured to lock the electronic component onto the housing; and a key, adapted to the locking assembly and controlling the locking assembly. By controlling the locking assembly with the key, the intelligent lock allows for quick installation and removal of the electronic component, facilitating maintenance operations such as repairs and battery replacement. Moreover, it enables switching between a keypad electronic lock component and a fingerprint electronic lock component, thereby meeting diverse user requirements, reducing workload, and minimizing resource waste associated with the need to repurchase door locks.

9 Claims, 6 Drawing Sheets

INTELLIGENT LOCK THAT REPLACES ELECTRONIC COMPONENTS WITH A KEY

TECHNICAL FIELD

The present application relates to an intelligent lock, and more particularly, to an intelligent lock enabling replacement of electronic components using a key.

BACKGROUND

With the advancement of technology, conventional mechanical door locks commonly used in daily life have been gradually replaced by intelligent locks. Common types of intelligent locks include keypad electronic locks and fingerprint electronic locks. During the installation and use process, if a user wishes to replace an installed intelligent lock with another type or a lock with different functionalities, it is necessary to replace the entire door lock assembly. Moreover, multiple locks must often be provided to meet the users' diverse needs, resulting in complicated procedures, increased workload, greater factory inventory requirements, and the waste of certain resources.

SUMMARY

An embodiment of the present application provides an intelligent lock enabling replacement of electronic components using a key, in order to address the problems existing in the related art. The technical solution is as follows: an embodiment of the present application provides an intelligent lock enabling replacement of electronic components using a key, comprising: a housing; an electronic component detachably mounted on the housing; a locking assembly disposed inside the housing and configured to lock the electronic component onto the housing; and a key adapted to the locking assembly, wherein the locking assembly is controlled by the key.

In one embodiment, the housing comprises an opening adapted to the shape of the electronic component. When the electronic component is installed on the housing, the electronic component is embedded into the housing through the opening, and the outer surface of the electronic component is flush with the outer surface of the housing.

In one embodiment, the electronic component comprises: a casing detachably disposed inside the housing, the casing having two first slots, wherein a portion of the locking assembly engages with the two first slots and a fixing block disposed at an end of the casing opposite to the first slots.

In one embodiment, the intelligent lock further comprises: a protrusion disposed inside the housing, wherein, when the casing is located within the housing, the protrusion abuts against the fixing block and is positioned above the fixing block; and a first spring disposed inside the housing, wherein, when the casing is located within the housing, the first spring abuts against the casing.

In one embodiment, the locking assembly comprises: a rotating block disposed inside the housing; a lock cylinder disposed inside the housing, wherein the rotating block is disposed on the lock cylinder, and the lock cylinder has a keyhole adapted to the key; a movable block disposed inside the housing, wherein the movable block abuts against the rotating block, and the movable block moves horizontally when the rotating block rotates, a second spring disposed between the movable block and the housing; a latching block disposed on the movable block, wherein the latching block engages with the first slot.

In one embodiment, a cross-section of the latching block has a triangular structure, and a cross-section of the first slot has an inverted "L"-shaped structure, the first slot including an inclined surface adapted to an inclined surface of the latching block.

In one embodiment, the movable block includes a stepped notch, and the rotating block includes a rotating block protrusion adapted to the stepped notch.

In one embodiment, the movable block includes a spring mounting portion, and the second spring is sleeved onto the spring mounting portion.

In one embodiment, the locking assembly further comprises: a limiting slider disposed below the movable block, the limiting slider having a limiting groove and abutting against the rotating block protrusion; a limiting block disposed inside the housing, wherein the limiting block is positioned within the limiting groove; and a third spring disposed between the limiting slider and the housing.

In one embodiment, the intelligent lock further comprises: a protective cover disposed on the housing, wherein the housing has a through hole adapted to the keyhole, and the protective cover is located at the through hole.

The advantages or beneficial effects of the above technical solutions at least include: by controlling the locking assembly with a key, quick installation and removal of the electronic component are facilitated, enabling easy maintenance, battery replacement, and other operations. Moreover, switching between a keypad electronic lock and a fingerprint electronic lock can be achieved, thereby meeting diverse user requirements, reducing workload, and minimizing the resource waste associated with repurchasing door locks.

The foregoing summary is provided merely for purposes of illustration and is not intended to be limiting in any way. Additional aspects, embodiments, and features will become readily apparent from the drawings and the following detailed description.

BRIEF DESCRIPTION OF DRAWINGS

In the accompanying drawings, unless otherwise specified, identical or similar reference numerals are used throughout the various figures to denote identical or similar components or elements. These drawings are not necessarily drawn to scale. It should be understood that these drawings depict certain embodiments disclosed in the present application and should not be considered as limiting the scope of the present application.

REFERENCE NUMERALS

Figure 1:
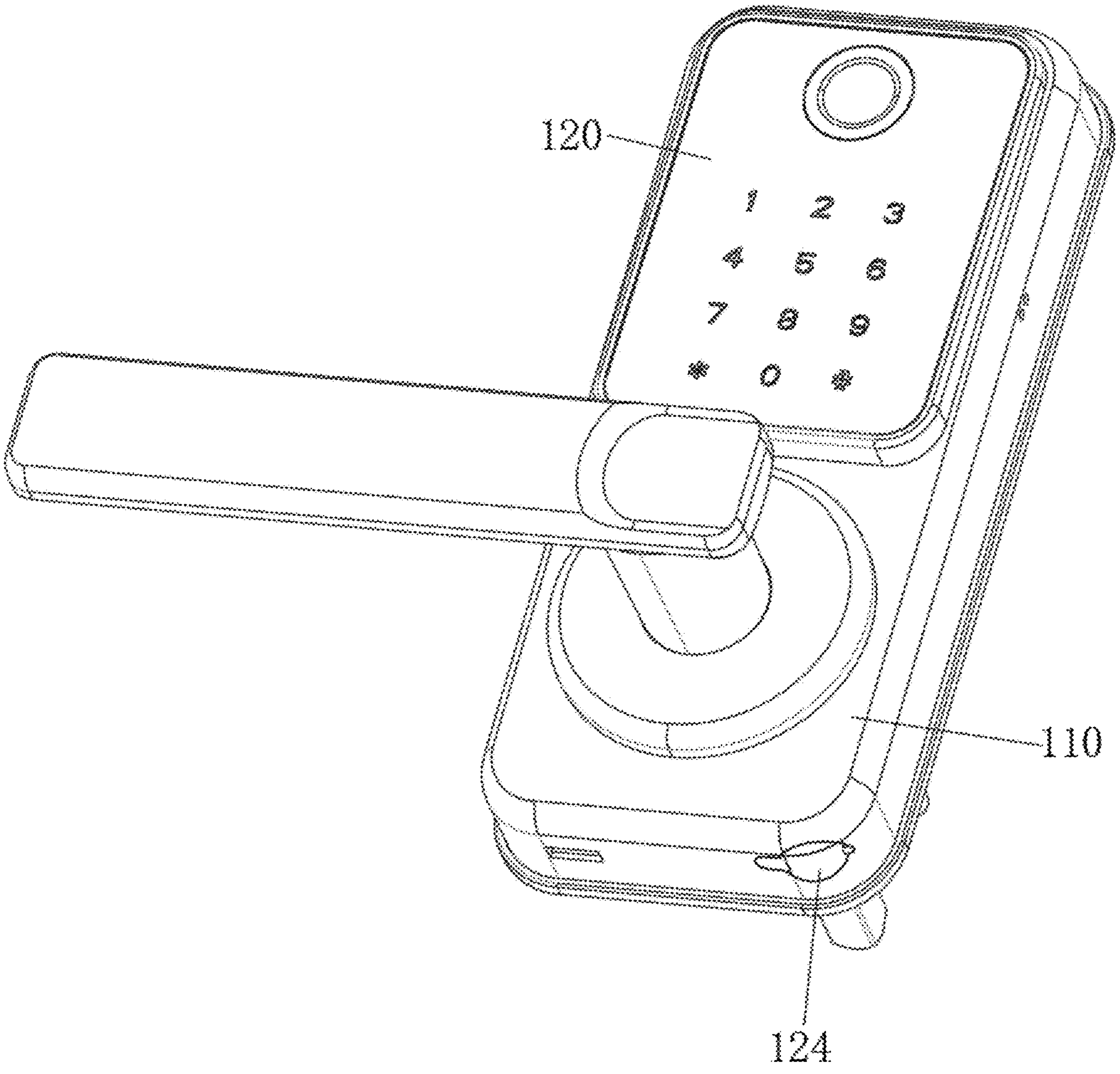
FIG. 1 is a schematic structural view of the intelligent lock according to the present invention.

100—Intelligent Lock;
110—Housing;
111—Protrusion;
112—First Spring;
120—Electronic Component;

121—Casing;
122—First Slot;
123—Fixing Block;
124—Protective Cover;
130—Locking Assembly;
131—Rotating Block;
132—Lock Cylinder;
133—Movable Block;
134—Second Spring;
135—Latching Block;
136—Limiting Slider;
137—Limiting Block;
138—Third Spring;
139—Rotating Block Protrusion.

DETAILED DESCRIPTION

The following provides a simplified description of certain exemplary embodiments. As will be recognized by those skilled in the art, various modifications may be made to the described embodiments without departing from the spirit or scope of the present application. Therefore, the drawings and the description are to be regarded as illustrative in nature and not as restrictive.

FIGS. 1 to 6 illustrate the structure of an intelligent lock 100 enabling replacement of an electronic component 120 using a key, according to an embodiment of the present application. As shown in FIGS. 1 to 6, the intelligent lock 100 may comprise: a housing 110; an electronic component 120, which is detachably mounted on the housing 110; a locking assembly 130, which is disposed inside the housing 110 and configured to lock the electronic component 120 onto the housing 110; and a key, adapted to the locking assembly 130, wherein the locking assembly 130 is controlled by the key.

In this embodiment, when it is necessary to remove the electronic component 120, the key is inserted into the keyhole provided on the housing 110 and rotated counterclockwise, thereby causing the locking assembly 130 to rotate and disengage a portion of the locking assembly 130 from the electronic component 120. After disengagement, the housing 110 ejects the electronic component 120, facilitating its replacement. During installation of the electronic component 120, one end of the electronic component 120, away from the locking assembly 130, is first inserted into the housing 110. After the key is rotated clockwise, the end of the electronic component 120 near the locking assembly 130 is pressed into the housing 110, and the key is then rotated counterclockwise to enable the locking assembly 130 to re-engage with the electronic component 120.

By controlling the locking assembly 130 with the key, quick installation and removal of the electronic component 120 are facilitated, making it convenient to perform maintenance operations such as repairs and battery replacement. Moreover, switching between a keypad electronic lock and a fingerprint electronic lock can be achieved, thereby meeting diverse user requirements, reducing workload, and minimizing the resource waste associated with repurchasing door locks.

Furthermore, the electronic component 120 may be a commonly used intelligent unlocking module in the market. The electronic component 120 is connected to the unlocking circuit of the electronic lock through a connector, facilitating the replacement of different types of electronic components 120 (such as for password unlocking or fingerprint unlocking).

Figure 2:
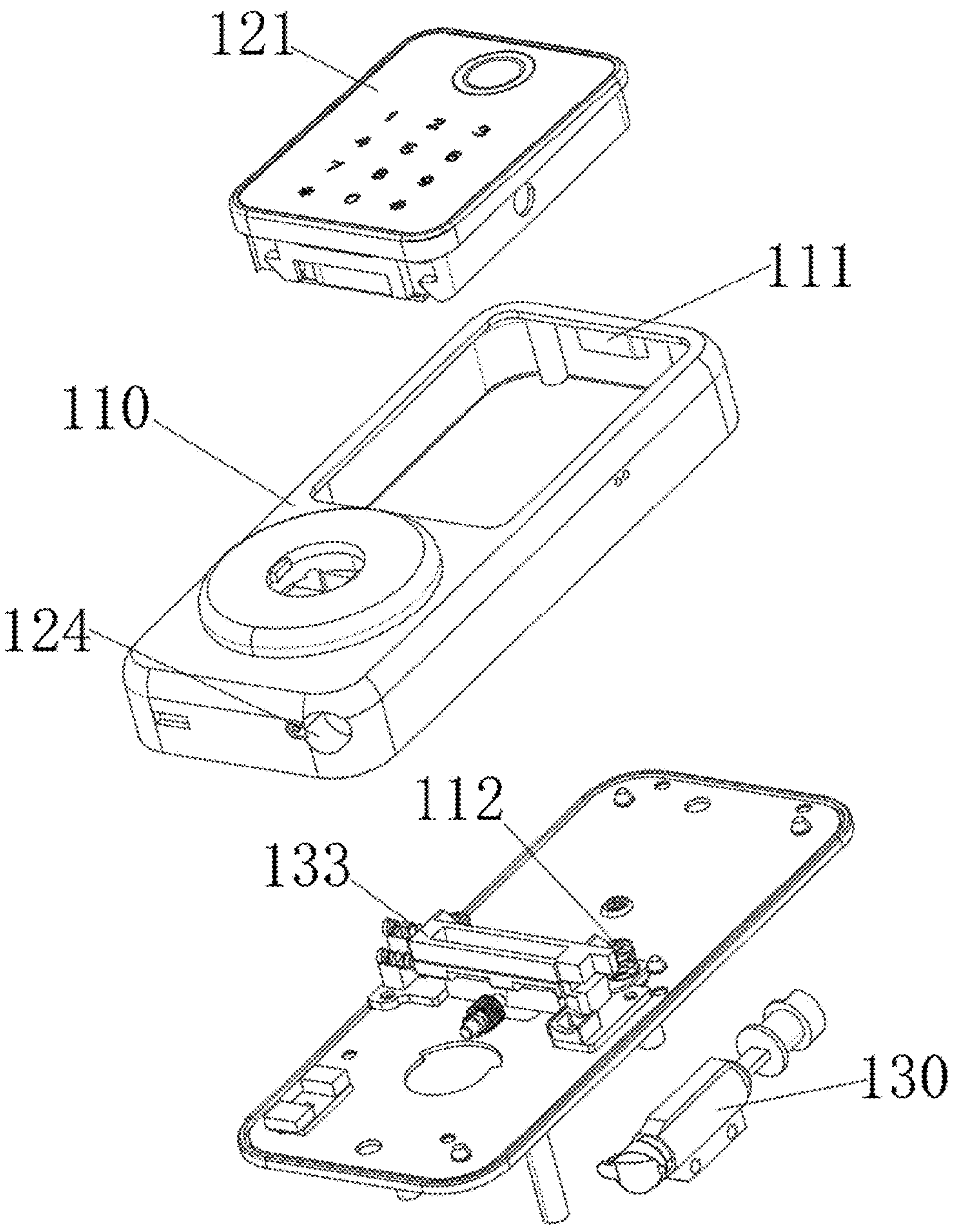
FIG. 2 is an exploded view of the interior of the housing shown in FIG. 1.

As shown in FIGS. 1 and 2, in one embodiment, the housing 110 includes an opening adapted to the shape of the electronic component 120. When the electronic component 120 is mounted on the housing 110, it is embedded into the housing 110 through the opening, and the outer surface of the electronic component 120 is flush with the outer surface of the housing 110.

In this embodiment, when the electronic component 120 is positioned inside the housing 110, it is embedded within the opening, ensuring that the surface of the electronic component 120 is flush with, or slightly protrudes above, the surface of the housing 110, thereby facilitating user operations such as password input or fingerprint verification.

Figure 5:
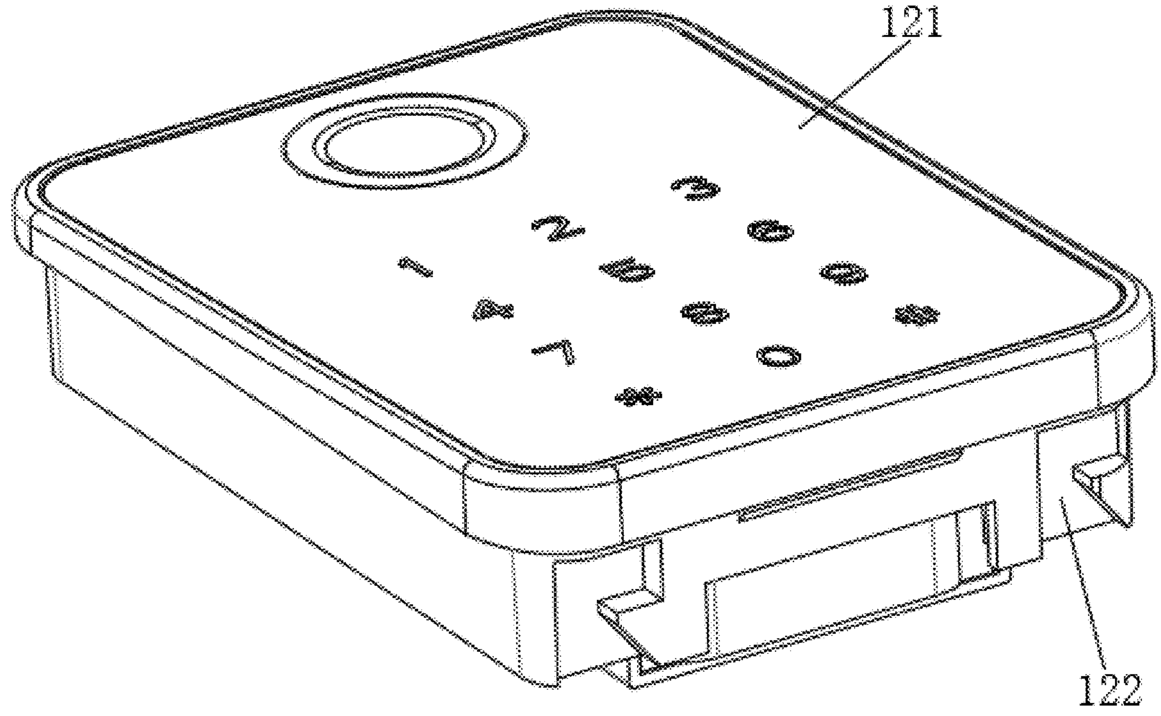
FIG. 5 is a schematic view showing the structure of the first slot on the casing.
Figure 6:
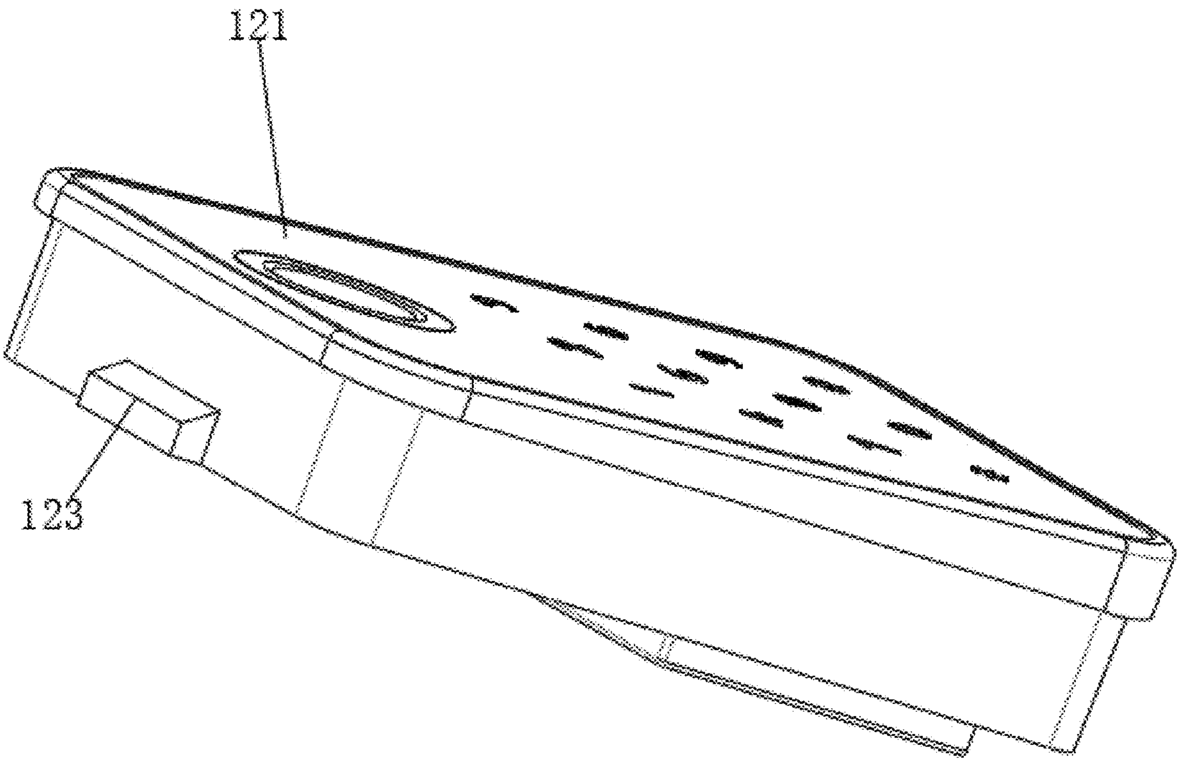
FIG. 6 is a schematic view showing the structure of the fixing block on the casing.

As shown in FIGS. 5 and 6, in one embodiment, the electronic component 120 comprises:

- a casing 121 detachably disposed inside the housing 110, the casing 121 having two first slots 122, wherein a portion of the locking assembly 130 engages with the first slots 122; and
- a fixing block 123 disposed at an end of the casing 121 opposite to the first slots 122.

In this embodiment, the casing 121 internally houses a commonly available electronic lock module, the details of which are not elaborated here. One end of the casing 121 is provided with two first slots 122 to facilitate engagement with the locking assembly 130. During installation, the end of the casing 121 with the fixing block 123 is first inserted into the opening of the housing 110, such that the fixing block 123 abuts against the housing 110. After insertion, the key is inserted into the keyhole, and the locking assembly 130 is rotated counterclockwise and fixed. Subsequently, the end of the casing 121 having the first slots 122 is pressed into the housing 110, and the key is released, allowing the portion of the locking assembly 130 to engage with the first slots 122, thereby completing the locking of the casing 121.

Furthermore, during installation of the casing 121, the key may not necessarily be used. The end of the casing 121 having the fixing block 123 may first be inserted into the opening of the housing 110, and then the end of the casing 121 having the first slots 122 is pressed downward into the housing 110, causing the locking assembly 130 to engage with the first slots 122 automatically.

As shown in FIGS. 2 and 6, in one embodiment, the intelligent lock further comprises: a protrusion 111 disposed inside the housing 110, wherein, when the casing 121 is located within the housing 110, the protrusion 111 abuts against the fixing block 123 and is positioned above the fixing block 123; and a first spring 112 disposed inside the housing 110, wherein, when the casing 121 is located within the housing 110, the first spring 112 abuts against the casing 121.

In this embodiment, during installation, the fixing block 123 is first pressed beneath the protrusion 111, and then the end of the casing 121 having the first slots 122 is pressed into the housing 110. When the casing 121 is inserted into the housing 110, the first spring 112 abuts against the casing 121 and compresses. When the key is inserted and used to control the locking assembly 130 to disengage from the first slots 122, the first spring 112 expands, causing the end of the casing 121 with the first slots 122 to be ejected from the housing 110, thereby facilitating the installation and removal of the casing 121.

Figure 3:
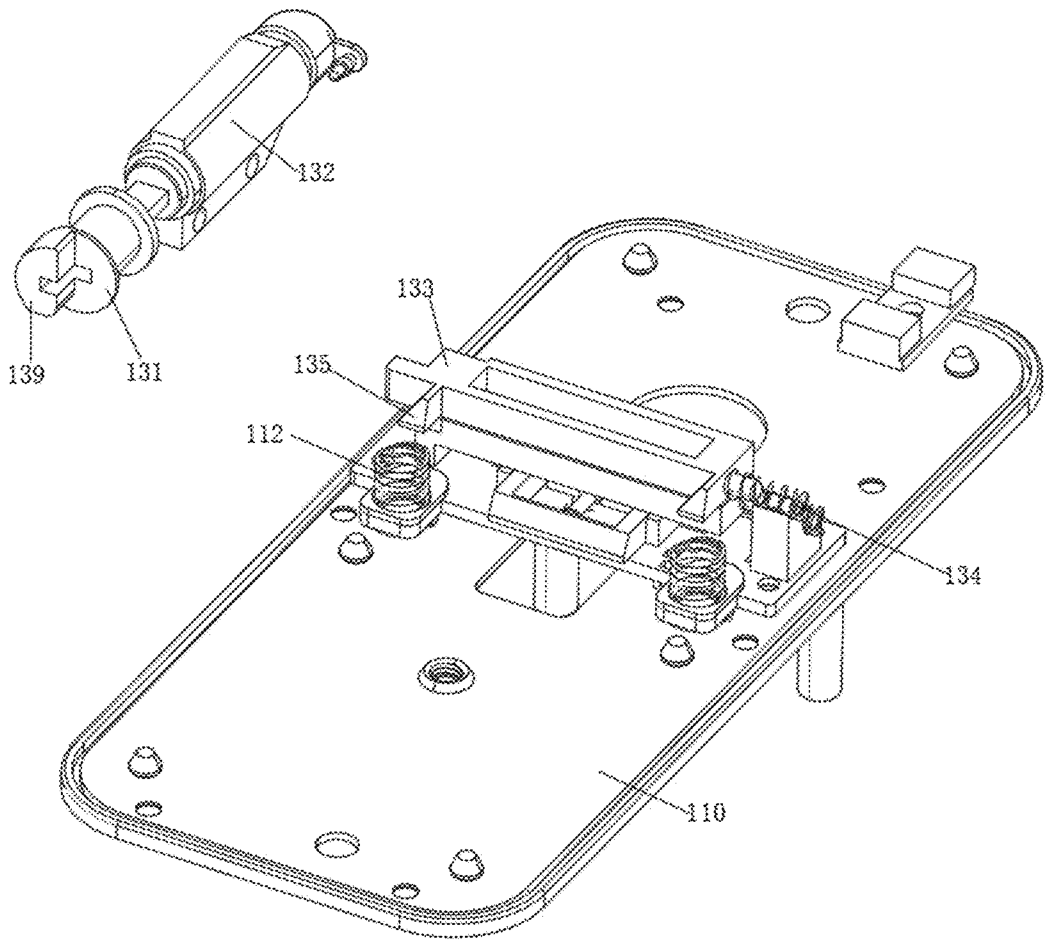
FIG. 3 is an exploded view of the locking assembly shown in FIG. 2.
Figure 4:
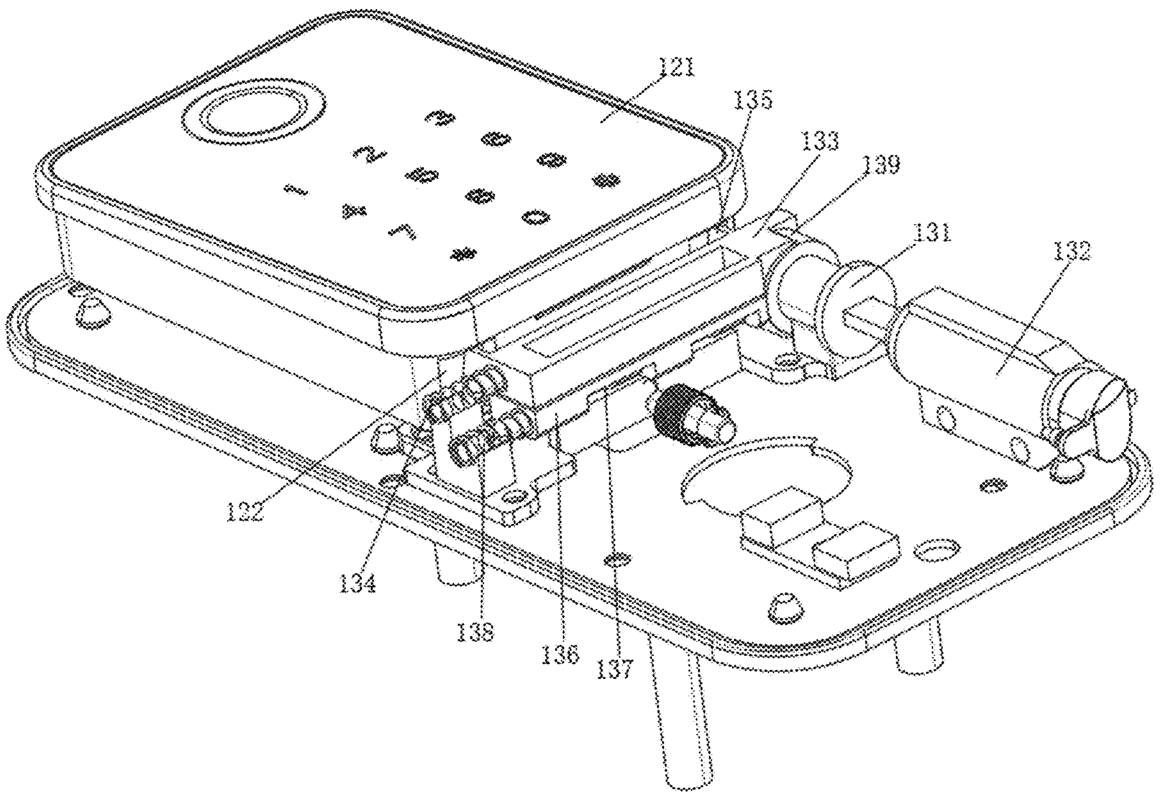
FIG. 4 is a schematic view showing the locking of the casing and the locking assembly.

As shown in FIGS. 2 to 4, in one embodiment, the locking assembly 130 comprises: a rotating block 131 disposed inside the housing 110; a lock cylinder 132 disposed inside the housing 110, wherein the rotating block 131 is mounted on the lock cylinder 132, and the lock cylinder 132 has a keyhole adapted to the key; a movable block 133 disposed inside the housing 110, wherein the movable block 133 abuts against the rotating block 131 and moves horizontally when the rotating block 131 rotates; a second spring 134 disposed between the movable block 133 and the housing 110; and a latching block 135 disposed on the movable block 133, wherein the latching block 135 engages with the first slot 122.

In this embodiment, the key is inserted into the lock cylinder 132 through the keyhole, and by rotating the lock cylinder 132 with the key, the movable block 133 is driven to move. The latching block 135 is fixedly disposed on the movable block 133, and the number of latching blocks 135 corresponds to the number of first slots 122. As the movable block 133 moves horizontally, the latching block 135 moves accordingly.

When the lock cylinder 132 is rotated counterclockwise by the key, the second spring 134 compresses, causing the latching block 135 to disengage from the first slot 122, thereby facilitate the removal of the casing 121. When the key is released, the second spring 134 expands, causing the movable block 133 to return to its original position, thereby driving the rotating block 131 and the lock cylinder 132 to reset.

Through the configuration of the movable block 133 and the second spring 134, the key can control the movement of the movable block 133 via the lock cylinder 132, thereby controlling the engagement and disengagement between the latching block 135 and the first slot 122, and thus achieving the locking and unlocking of the casing 121.

When the casing 121 is pressed into the housing 110, the latching block 135 moves along with the first slot 122, thereby driving the movable block 133 to move, enabling the latching block 135 to engage into the first slot 122. During the process of the latching block 135 entering the first slot 122, the second spring 134 compresses, and after the latching block 135 is fully engaged into the first slot 122, the second spring 134 expands, thereby tightly pressing the latching block 135 against the first slot 122 to achieve the locking of the casing 121.

As shown in FIGS. 2 to 5, in one embodiment, the cross-section of the latching block 135 has a triangular structure, and the cross-section of the first slot 122 has an inverted "L"-shaped structure. The first slot 122 includes an inclined surface adapted to the inclined surface of the latching block 135.

In this embodiment, the first slot 122 has an inverted "L" shape. When the housing 110 is pressed into the casing 121, the latching block 135 moves along the vertical channel of the first slot 122, during which the second spring 134 is compressed. When the latching block 135 enters the horizontal channel of the first slot 122, the second spring 134 expands, thereby pressing the latching block 135 tightly into the horizontal channel of the first slot 122, thus locking the casing 121 inside the housing 110.

Furthermore, the inclined surfaces of the first slot 122 and the latching block 135 are mutually adapted. When the latching block 135 enters the vertical channel, the inclined surface of the latching block 135 abuts against the inclined surface of the first slot 122. This configuration allows the movable block 133 to move in the direction of the second spring 134 as the latching block 135 transitions from the vertical channel to the horizontal channel. When the latching block 135 enters the horizontal channel, the second spring 134 expands, enabling the latching block 135 to be fixed within the horizontal channel of the first slot 122.

When the key is inserted into the lock cylinder 132, the rotating block 131 controls the horizontal movement of the movable block 133, thereby causing the latching block 135 to move from the horizontal channel back into the vertical channel of the first slot 122. At this point, the first spring 112 ejects the end of the casing 121 having the first slots 122.

As shown in FIGS. 2 to 5, in one embodiment, the movable block 133 includes a stepped notch, and the rotating block 131 includes a rotating block protrusion 139 adapted to the stepped notch. In this embodiment, the cross-section of the rotating block 131 is circular, and the cross-section of the rotating block protrusion 139 is semi-circular. The radius of the rotating block protrusion 139 matches the radius of the cross-section of the rotating block 131. In the initial state, the flat surface of the rotating block protrusion 139 abuts against the movable block 133.

When the lock cylinder 132 is rotated by the key, the flat surface of the rotating block protrusion 139 rotates, causing the rotating block protrusion 139 to engage with the stepped notch of the movable block 133. As the rotating block protrusion 139 rotates, it pushes the movable block 133 to move, thereby causing the latching block 135 to disengage from the horizontal channel of the first slot 122, and compressing the second spring 134.

As shown in FIGS. 2 to 4, in one embodiment, the movable block 133 includes a spring mounting portion, and the second spring 134 is sleeved onto the spring mounting portion. In this embodiment, the spring mounting portion facilitates the installation of the second spring 134 between the housing 110 and the movable block 133, providing guidance and fixation for the second spring 134.

In one embodiment, the locking assembly 130 further comprises: a limiting slider 136 disposed below the movable block 133, the limiting slider 136 having a limiting groove and abutting against the rotating block protrusion 139; a limiting block 137 disposed inside the housing 110, wherein the limiting block 137 is positioned within the limiting groove; and a third spring 138 disposed between the limiting slider 136 and the housing 110.

In this embodiment, when the key controls the rotating block 131 to rotate counterclockwise, the movable block 133 compresses the second spring 134, while the third spring 138 expands, causing the limiting slider 136 to move in the direction opposite to the movement of the movable block 133. Conversely, when the second spring 134 expands, it drives the movable block 133 to move, thereby causing the rotating block 131 to rotate clockwise. At this time, the limiting slider 136 moves in the opposite direction relative to the movable block 133, and the third spring 138 compresses, ensuring the stability of the rotating block 131 during rotation.

Furthermore, a spring assembly is also disposed inside the lock cylinder 132, ensuring that the rotating block 131 can promptly reset when rotational force is no longer applied to the key. Moreover, the stiffness coefficient of the second spring 134 is greater than that of the third spring 138, ensuring that the third spring 138 does not drive the rotating block 131 to rotate, but rather allows the movable block 133 to move.

As shown in FIGS. 1 and 2, in one embodiment, the intelligent lock further comprises: a protective cover 124 disposed on the housing 110, wherein the housing 110 has a through hole adapted to the keyhole, and the protective cover 124 is located at the through hole. In this embodiment, the protective cover is provided to protect the keyhole, preventing dust accumulation in the keyhole and avoiding adverse effects on subsequent usage.

The functions of the modules in the devices described in the foregoing embodiments correspond to the steps of the methods described above and will not be repeated. As used herein, terms such as “an embodiment,” “one embodiment,” “some embodiments,” “an example,” or “a specific example” refer to at least one implementation of the invention. The features described in connection with individual embodiments may be combined in other embodiments unless the combination is inconsistent with the overall disclosure.

Additionally, the terms “first,” “second,” and the like are used solely for distinguishing elements and do not imply any order, priority, or quantity unless expressly stated.

The foregoing description is intended to illustrate, and not to limit, the scope of the invention. Various modifications and substitutions will be apparent to those of ordinary skill in the art without departing from the scope of the invention, which is defined by the claims.

What is claimed is:

1. An intelligent lock enabling replacement of electronic components using a key, comprising: a housing; an electronic component detachably mounted on the housing; wherein the electronic component comprises: a casing detachably disposed inside the housing, the casing having two first slots, wherein a portion of the locking assembly engages with the first slots; and a fixing block disposed at an end of the casing opposite to the two first slots; a locking assembly disposed inside the housing and configured to lock the electronic component onto the housing; and a key adapted to the locking assembly, wherein the locking assembly is controlled by the key.

2. The intelligent lock according to claim 1, wherein the housing comprises an opening adapted to the shape of the electronic component, such that when the electronic component is mounted on the housing, the electronic component is embedded into the housing through the opening, and the outer surface of the electronic component is flush with the outer surface of the housing.

3. The intelligent lock according to claim 1, further comprising: a protrusion disposed inside the housing, wherein, when the casing is located within the housing, the protrusion abuts against the fixing block and is positioned above the fixing block; and a first spring disposed inside the housing, wherein, when the casing is located within the housing, the first spring abuts against the casing.

4. The intelligent lock according to claim 1, wherein the locking assembly comprises: a rotating block disposed inside the housing; a lock cylinder disposed inside the housing, the rotating block being disposed on the lock cylinder, the lock cylinder having a keyhole adapted to the key; a movable block disposed inside the housing, the movable block abutting against the rotating block, wherein the movable block moves horizontally when the rotating block rotates; a second spring disposed between the movable block and the housing; and a latching block disposed on the movable block, wherein the latching block engages with the first slot.

5. The intelligent lock according to claim 4, wherein a cross-section of the latching block has a triangular structure, a cross-section of the first slot has an inverted “L”-shaped structure, and the first slot includes an inclined surface adapted to an inclined surface of the latching block.

6. The intelligent lock according to claim 4, wherein the movable block includes a stepped notch, and the rotating block includes a rotating block protrusion adapted to the stepped notch.

7. The intelligent lock according to claim 4, wherein the movable block includes a spring mounting portion and the second spring is sleeved onto the spring mounting portion.

8. The intelligent lock according to claim 6, wherein the locking assembly further comprises: a limiting slider disposed below the movable block, the limiting slider having a limiting groove, and the limiting slider abutting against the rotating block protrusion; a limiting block disposed inside the housing, wherein the limiting block is positioned within the limiting groove; and a third spring disposed between the limiting slider and the housing.

9. The intelligent lock according to claim 4, further comprising: a protective cover disposed on the housing, wherein the housing has a through hole adapted to the keyhole, and the protective cover is located at the through hole.

* * * * *